Sept. 6, 1966      A. C. WALLACE      3,270,493
TIME CONTROLLED LOCATING ALARM SYSTEM
Filed April 23, 1965      3 Sheets-Sheet 1
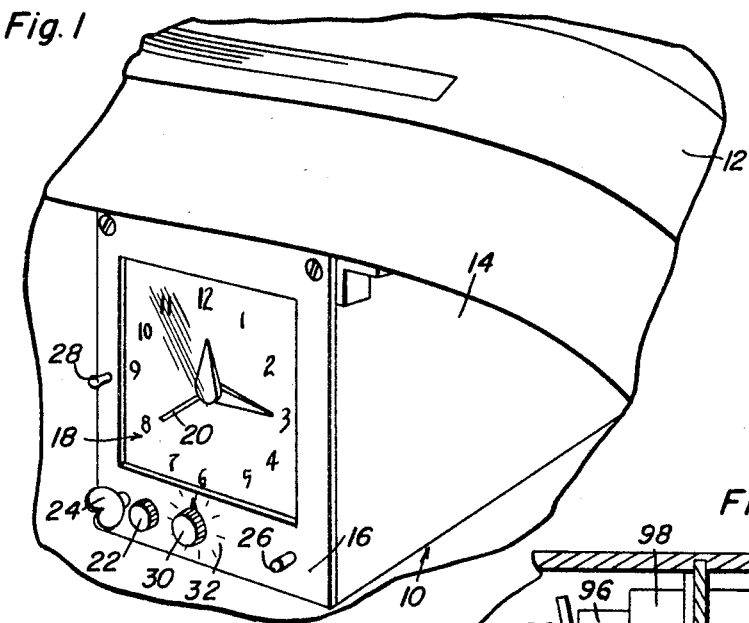
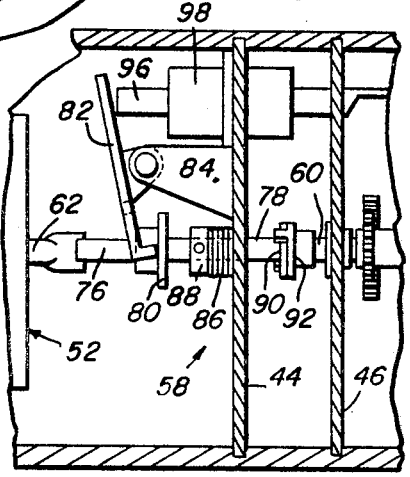
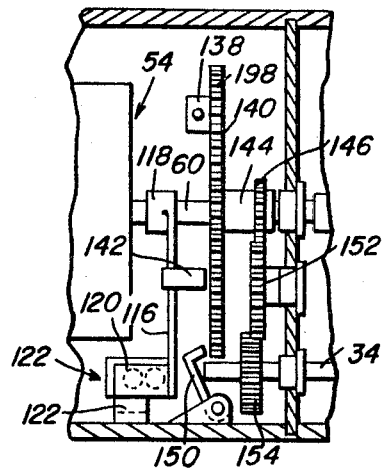
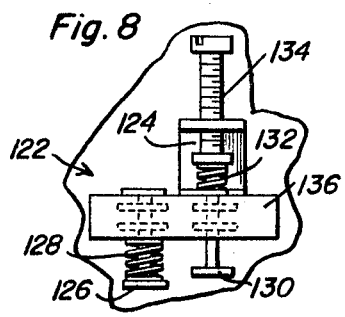
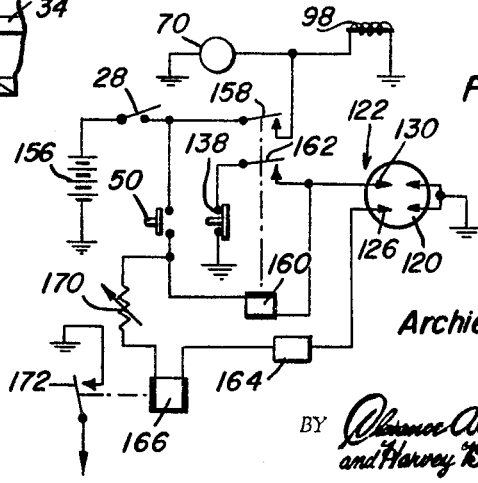
Archie C. Wallace
INVENTOR.

Sept. 6, 1966 A. C. WALLACE 3,270,493
TIME CONTROLLED LOCATING ALARM SYSTEM
Filed April 23, 1965 3 Sheets-Sheet 2
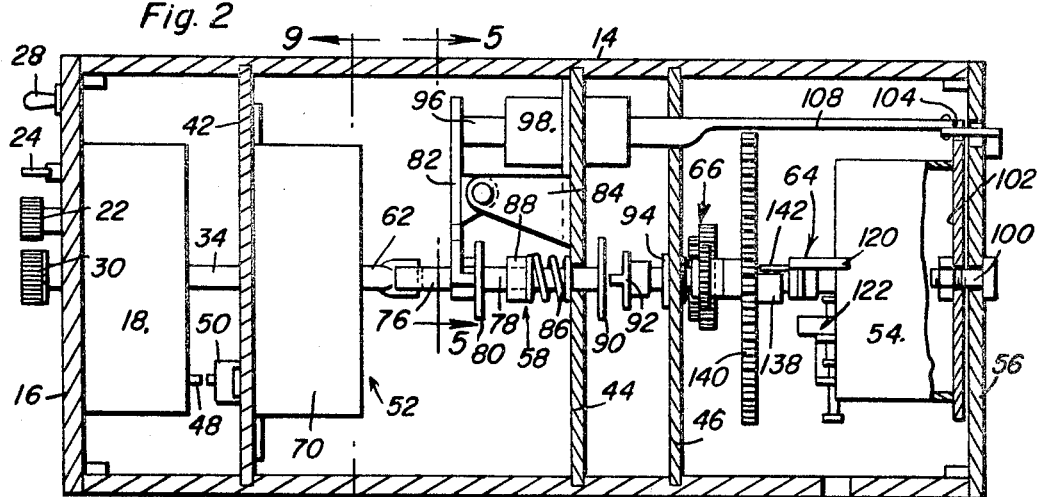
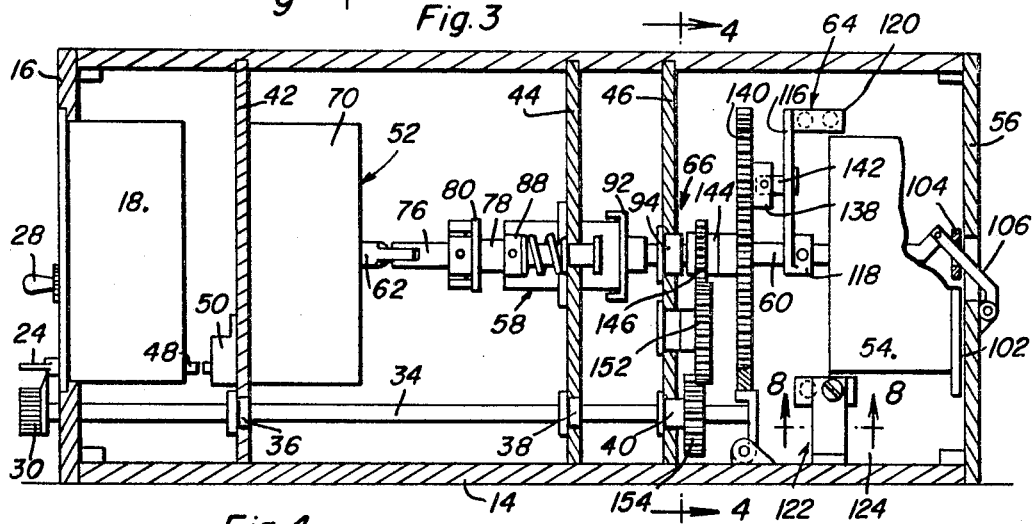
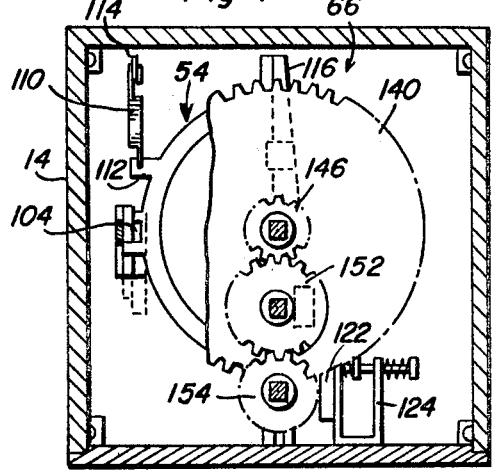
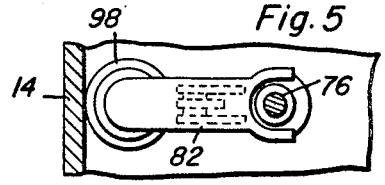
Archie C. Wallace
INVENTOR.

Sept. 6, 1966 A. C. WALLACE 3,270,493
TIME CONTROLLED LOCATING ALARM SYSTEM
Filed April 23, 1965 3 Sheets-Sheet 3
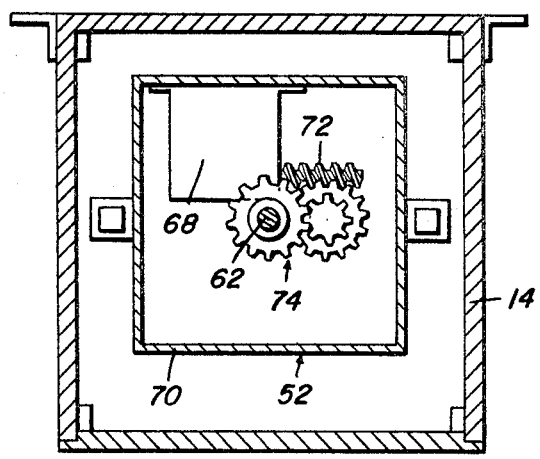
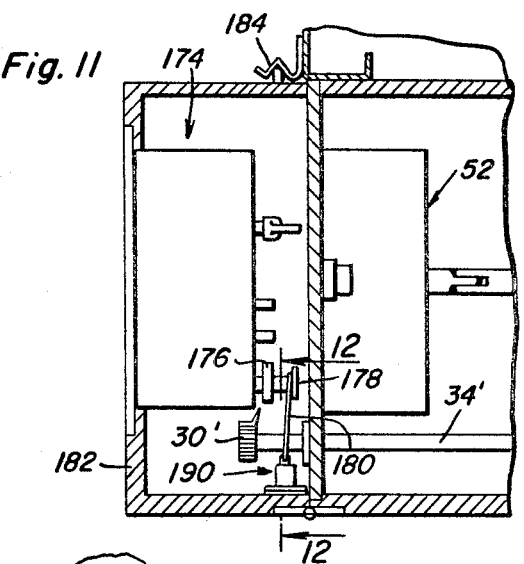
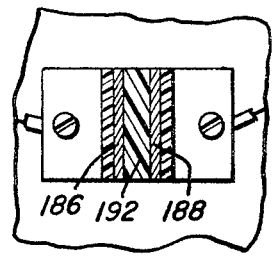
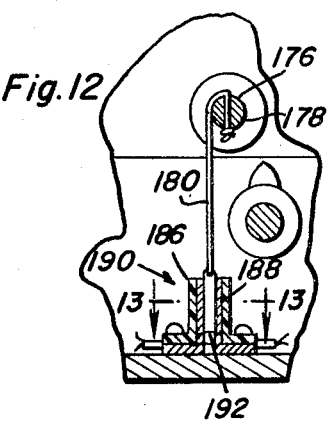
Archie C. Wallace
INVENTOR.

United States Patent Office 3,270,493
Patented Sept. 6, 1966

3,270,493
TIME CONTROLLED LOCATING ALARM SYSTEM
Archie C. Wallace, Rte. 1, Box 10, Elmer, La.
Filed Apr. 23, 1965, Ser. No. 450,334
12 Claims. (Cl. 58—152)

This invention relates to an alarm device and more particularly to a time-controlled alerting mechanism which is operative to periodically produce an alerting signal beginning at a preset time.

One important object of the present invention is to provide a time controlled alerting device adapted to be mounted in an automotive vehicle, for example, whereby after the elapse of a preset amount of time, the device is rendered operative to repeatedly operate a signal producing mechanism such as the vehicle horn at spaced apart intervals of time. In this manner, the alerting device of the present invention will be useful in establishing the location of the vehicle in which it is mounted after the vehicle is left unattended for a certain period of time.

An additional object of the present invention is to provide a time controlled signal alerting device which utilizes any suitable mechanical timer and an alarm-type clock to perform the timing and alarm operating functions associated with the present invention.

A still further object of the present invention is to provide an electromechanical control system which is operationally reliable in performing a timed alarm operating function in conjunction with a mechanical type timer and an alarm clock.

In accordance with the foregoing objects, the alarm operating device of the present invention responds to alarm operation of an alarm clock to energize a timer winding motor so as to wind the mechanical type timer by a preset amount in order to establish a periodically repeated timing interval between which an alerting signal is produced. When the timer has been so set, it is released for operation by a novel releasing mechanism so that the timer shaft may return toward its zero position. As the timer approaches its zero position, however, it is operative to initiate operation of an alerting device such as a vehicle horn until the timing cycle is completed and a new cycle is then repeated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing the alarm operating device of the present invention in one typical installation;

FIGURE 2 is a top sectional view through the alarm operating device shown in FIGURE 1;

FIGURE 3 is a side sectional view through the alarm operating device;

FIGURE 4 is a transverse sectional view taken substantially through a plane indicated by section line 4—4 in FIGURE 3;

FIGURE 5 is a partial sectional view taken substantially through a plane indicated by the section line 5—5 in FIGURE 2;

FIGURE 6 is a top sectional view of a portion of the device shown in another operative condition;

FIGURE 7 is a side sectional view of a portion of the device shown in another operative condition;

FIGURE 8 is an enlarged partial sectional view taken substantially through a plane indicated by the section line 8—8 in FIGURE 3;

FIGURE 9 is a transverse sectional view taken substantially through a plane indicated by section line 9—9 in FIGURE 2;

FIGURE 10 is an electrical circuit diagram associated with the device of the present invention;

FIGURE 11 is a partial side sectional view of a modified form of alarm alerting device in accordance with the present invention;

FIGURE 12 is an enlarged partial sectional view taken substantially through a plane indicated by the section line 12—12 in FIGURE 11; and FIGURE 13 is an enlarged partial sectional view taken substantially through a plane indicated by section line 13—13 in FIGURE 12.

Referring now to the drawings in detail one form of alarm operating device constructed in accordance with the present invention, is shown in FIGURE 1 and is generally denoted by reference numeral 10. The device 10 as shown in FIGURE 1, is installed for example below the dashboard mounting 12 of an automotive type vehicle in in which case electrical energy for operating various components thereof may be derived from the vehicle battery and the device may be so connected as to operate the vehicle horn in order to produce the alerting signal. It will be appreciated, of course, that the device 10 could be mounted in other installations and arranged to operate other types of alerting signal devices. In the vehicle installation, however, it may be conveniently held within an elongated housing 14 closed at one end by the face plate 16 of any suitable alarm clock generally referred to by the reference numeral 18. The clock 18 may accordingly be provided with an alarm indicating pointer 20 which may be adjustably positioned at any desired time by the alarm setting control knob 22 projecting from the face plate 16. An alarm winding knob 24 may also be provided while an alarm resetting button 26 is also shown whereby alarm operation of the clock 18 may be stopped when desired. Also mounted on the face plate 16 is an on-off switch 28 through which the device 10 of the present invention is set into operation by connecting it to a source of electrical energy such as the vehicle battery.

Also projecting from the face plate 16 of the alarm clock, is a timer setting control knob 30 having a pointer cooperating with an interval selecting dial face 32. The control knob 30 is connected to one end of a timer setting shaft 34 journaled within the spaced bearing members 36, 38 and 40 mounted respectively in the housing partition members 42, 44 and 46 as shown in FIGURE 3. The alarm clock 18 projects rearwardly from the face plate 16 into the chamber formed between the face plate 16 and the partition member 42. The alarm clock is of a type which is provided with a rearwardly projecting plunger element 48 operatively connected to the alarm mechanism of the clock so that the plunger is extended in response to alarm operation. The plunger element 48 is therefore aligned in close spaced relation to the actuating element of a microswitch 50 mounted on the partition member 42 so that the microswitch is actuated when the alarm goes off. Also mounted by the partition member 42 on the side thereof opposite the microswitch 50, is a timer winding motor assembly generally referred to by reference numeral 52. The motor assembly is adapted to be coupled and uncoupled with a mechanical type timer 54 mounted within the housing in the chamber between the partition member 46 and the end closure member 56 as shown in FIGURES 2 and 3. A clutch mechanism generally referred to by reference numeral 58 is supported by the partition members 44 and 46 and is operative to couple and uncouple the timer shaft 60 with the output shaft 62 of the motor assembly 52. Secured to the timer shaft 60 between the partition member 46 and the end closure member 56 is a timer driven switch actuator generally referred to by reference numeral 64. Also mounted within the rear chamber adjacent to the partition member 46, is a timer setting gear assembly generally referred to by reference numeral 66 drivingly connected to the manually operable timer setting shaft 34. The timer winding motor assembly 52 as shown in FIGURES 2, 3 and 9, includes an electric motor 68 mounted within the motor assembly housing 70. The motor shaft is drivingly connected at a reduction ratio to the output shaft 62 by means of the worm gearing 72 and the reduction gearing 74 so as to impart relatively slow rotation to the timer shaft 60 when the motor 68 is energized.

The clutch mechanism 58 is therefore arranged to couple the output shaft 62 of the motor assembly to the timer shaft when the motor is energized. The clutch mechanism includes a drive shaft 76 pivotally connected to the output shaft 62 of the motor assembly to which a clutch member 78 is splined for slidable movement relative thereto. The clutch member 78 rotatably mounts an axial thrust member 80 engaged by a clutch actuating fork element 82 pivotally mounted by the pivot bracket 84 secured to the partition member 44 as more clearly seen in FIGURES 2 and 5. The clutch member 78 is biased to a clutch disengaged position by a spring element 86 reacting between the partition member 44 and a spring stop element 88 secured to the clutch member 78. A drive clutch element 90 is secured to the drive end of the clutch member 78 between the partition members 44 and 46 so that it may be received between the projecting fingers of the driven clutch element 92 when the clutch member 78 is displaced against the bias of the spring element 86 by the clutch actuating member 82. The driven clutch element is connected to the end of the timer shaft 60 which extends beyond the supporting bearing 94 mounted within the partition member 46. It will therefore be apparent that upon displacement of the clutch actuating element 82 from the position shown in FIGURE 2 to the position shown in FIGURE 6, the clutch mechanism 58 will be engaged so that after relative take-up rotation between the clutch elments 90 and 92, the timer shaft 60 will be coupled to the output shaft 62 of the motor assembly. The clutch actuating element 82 is displaced to the clutch engaging position by means of a solenoid plunger element 96 associated with the solenoid coil 98 fixedly mounted by the partition member 44.

It will be apparent that engagement of the clutch mechanism 58 is effected whenever the solenoid coil 98 is energized, displacing the clutch member 78 against the bias of the spring element 86. Disengagement of the clutch mechanism 58 on the other hand occurs when the solenoid coil 98 is deenergized. However, in order to ensure disengagement of the clutch elements 90 and 92, upon deenergization of the solenoid coil 98, torque release means is provided for angularly displacing the timer shaft 60 relative to the clutch member 78 in order to back off the engaging portions of the driven clutch member 92 from the drive clutch element 90. Toward this end, the timer 54 is mounted for limited angular displacement relative to the end closure member 56 by the mounting bolt 100 which extends through the end closure member 56 and the back mounting plate 102 of the timer. The back plate member 102 is formed with a cam slot 104 as shown in FIGURES 2, 3 and 4 through which a lever element 106 extends. The lever element 106 is pivotally mounted on the end closure member 56 and is pivotally connected to an extension rod 108 secured to the solenoid plunger 96. An anchoring spring 110 as shown in FIGURE 4 is connected at one end to an extension 112 on the timer and at its other end to an anchoring element 114 on the housing. Accordingly, the timer is angularly biased to one limit position from which it is displaced by the lever element 106 when the solenoid plunger is axially displaced upon energization of the solenoid coil 98 to engage the clutch mechanism. Therefore, upon deenergization of the solenoid coil 98, the spring 110 will angularly displace the timer by a limited amount in order to back off the driven clutch element 92 to which the timer shaft is connected as hereinbefore indicated.

Operation of the alarm operating device of the present invention is controlled by the switch actuator 64 driven by the timer shaft 60 as hereinbefore indicated. The switch actuator includes a mounting arm 116 as more clearly seen in FIGURES 3 and 7 secured by the hub portion 118 to the timer shaft 60. A grounding contact plate member 120 is secured to the radially outer end of the arm 116 and is axially aligned with a stop switch assembly 122 secured by the bracket 124 to the housing. With the timer in a zero position, the ground contact member 120 is disposed substantially in engagement with the stop switch 122 as shown in FIGURE 7. Accordingly, when the timer is rotated by the timer winding motor assembly to a timing position such as shown in FIGURE 3, the timer shaft 60 when released from the motor assembly by the clutch mechanism 58, will slowly rotate the switch arm 116 in such a direction to bring the contact plate member 120 into engagement with the stop switch 122 when the timer reaches the zero position. As more clearly seen in FIGURE 8, a switch plate member 136 secured to the bracket 124 slidably mounts a contact member 126 which is biased to a forward position by the spring element 128 so that the contact member 126 will initially and yieldably engage the contact plate 120 as the timer approaches its zero position. Accordingly, after elapse of a short timing interval following engagement of the yieldably mounted contact element 126, the second contact element 130 will engage the plate 120. The plate 120 may mount two corresponding grounding contact elements for respectively engaging the contact elements 126 and 130. The contact element 130 is also slidably mounted in the plate member 136 and is biased by the spring element 132 against an adjustably positioned screw member 134 supported by a rearwardly extending bracket 124. It will therefore be apparent that by threadedly positioning the screw member 134, the position of the contact element 130 may be adjusted relative to the yieldably mounted contact element 126. Thus, the contact elements 126 and 130 will sequentially establish contact with the contact elements on the plate 120, the interval between contact of the respective contact elements being adjustable by means of the screw member 134.

The position to which the switch arm 116 is angularly displaced with the timer shaft 60, is controlled by a normally closed limit switch 138 mounted on a positioning disk member 140. Accordingly, the motor assembly 52 and the clutch mechanism 58 are deenergized when the normally closed limit switch 138 is actuated by a switch actuating element 142 secured to the switch arm 116 as shown in FIGURE 3. It will therefore be apparent that the amount by which the timer is displaced from its zero position will depend upon the angular position of the switch mounting disk member 140. The disk member 140 is rotatably mounted on the timer shaft 60 by a tubular sleeve portion 144 to which a pinion gear 146 is connected. The switch mounting disk member 140 is also provided with peripheral teeth 148 adapted to be engaged by a pivotally mounted lock element 150 biased to a locked position by a spring element (not shown).

Thus, the switch mounting disk member 140 is locked in its adjusted position. To change the position at which the switch mounting disk member 140 is held, the manually operable timer setting shaft 34 is axially displaced inwardly by means of the control knob 30 to the position shown in FIGURE 7 in order to bring the lock element 150 out of engagement with the disk member 148. The timer setting shaft 34 may then be rotated in order to impart angular displacement to the disk member 140. Toward this end, the pinion gear 146 is enmeshed with an idler gear 152 rotatably mounted by the partition member 46, the idler gear being in turn enmeshed with a slidably displaceable drive gear 154 secured to the shaft 34.

Referring now to FIGURE 10, it will be observed that the alarm operating device 10 when associated with an automotive vehicle installation, will receive electrical energy from the vehicle battery 156. The positive terminal of the battery is therefore connected to the on-off switch 28 so that upon closing thereof, electrical energy may be supplied to both the motor 70 and the solenoid coil 98 upon closing of the relay switch 158. The relay switch 158 is closed upon energization of the relay coil 160 connected through the on-off switch 28 to the battery 156 upon closing of the microswitch 50 by alarm operation of the alarm clock 18 as aforementioned. An energizing circuit is therefore completed for the relay coil 160 upon closing of the normally opened microswitch 50 when the ground terminal of the relay coil is grounded by the timer driven switch assembly 64. The relay coil 160 will, however, be grounded only when the timer is in its zero position with both contacts 126 and 130 thereof engaged. As soon as the motor 70 and solenoid coil 98 are energized, the contacts 126 and 130 are sequentially opened. The relay coil 160 is, however, maintained energized upon closing of the relay holding switch 162 connecting the ground terminal of the relay coil 160 to ground through the normally closed limit switch 138. Thus, the relay coil 160 remains energized to continue rotation of the timer from its zero position until the limit switch 138 is opened as aforementioned. The relay coil 160 is then deenergized so that opening of the relay switch 158 deenergizes the motor 70 and the solenoid coil 98. The timer 54 then begins its timing cycle. As the timing cycle approaches its end, contact 126 of the switch assembly 64 is initially engaged to complete a ground circuit through the flasher unit 164 to the horn relay coil 166 connected through the adjustable resistor 170, the microswitch 50 and the on-off switch 28 to the vehicle battery 156. Accordingly, the horn relay 166 will be intermittently energized to intermittently operate the horn through the relay switch 172. When the timer completes its timing cycle, the contact 130 of the switch assembly 64 closes in order to complete once again an energizing circuit for the relay coil 160. The cycle is then repeated. The foregoing cycle will therefore be repeated as long as the on-off switch 28 and the microswitch 50 are closed. Upon opening of either of these switches, the relay coil 160 will be deenergized so that regardless of the position of the timer, it will return to its zero position to automatically reset the device for subsequent operation.

Referring now to FIGURES 11 through 13, a modified form of alarm operating device is shown utilizing a different form of alarm clock 174. The alarm clock 174 is of commonly available type having an alarm winding element 176 which extends rearwardly of the alarm clock and to which a winding element 178 may be connected in order to wind a flexible element 180 thereon in response to alarm operation of the alarm clock. Therefore, in this form of the invention, the alarm clock 174 is mounted within a hinged section 182 of the housing enclosing the alarm operating device. The hinged section is held closed by any suitable detent device 184 so that it may be opened upwardly exposing the rear portion of the alarm clock in order to permit it to be rewound as well as to expose the alarm setting control knob 30' connected to the end of the timer setting shaft 34' which is similar in function to the timer setting shaft 34 described in connection with the previous form of the invention. Also in place of the normally open microswitch 50 previously described, the form of the invention shown in FIGURES 11–13 includes a pair of resilient contact elements 186 and 188 mounted within the alarm responsive switch device 190. The contact elements are held spread apart by a non-conductive member 192 secured to the flexible element 180 so that during alarm operation of the alarm clock, winding of the element 178 will withdraw the non-conductive spacer element 192 between the contact elements 186 and 188. Therefore, the contact elements will close in order to complete a circuit as described in connection with FIGURE 10 with reference to the microswitch 50. Accordingly, except for the use of a different type of alarm clock, its mounting and its associated switch device 190, the alarm operating device to which FIGURES 11–13 pertain, is otherwise the same as described with respect to FIGURES 1 through 10.

From the foregoing description, the construction, operation and utility of the alarm operating device of the present invention will be apparent. It will therefore be appreciated that the alarm operating system of the present invention employs any suitable alarm clock and mechanical type of timer 54 to establish time controlled operation of a signal alerting device such as the horn of an automotive vehicle. The alarm clock may therefore be set to go off at any desired time and the timer 54 set by means of the control knob 30 or 30' to establish a preset timing interval by angularly positioning the switch mounting disk 140 on which the normally closed limit switch 138 is mounted. After the switch mounting disk member is positioned, release of the control knob will permit the lock element 150 to return to its lock position holding the disk member in its adjusted position. When the alarm clock goes off, it will close the microswitch 50 or the switch device 190 to complete an energizing circuit for the relay coil 160 inasmuch as the switch assembly 64 will then be disposed in its closed position. Energization of the relay coil 160 will energize the timer winding motor assembly which is then coupled by the clutch mechanism 58 to the timer shaft 60 by energization of the solenoid operated clutch mechanism 58. The timer is therefore displaced from its zero position opening the switch assembly 122. The relay coil 160, however, remains energized through a holding circuit established through the relay holding switch 162 and the normally closed limit switch 138. Thus, when the switch arm 116 connected to the timer shaft opens the normally closed limit switch 138, the motor is deenergized and the clutch mechanism 58 disengaged thereby releasing the timer shaft 60 in order to permit the timer to begin its timing cycle. Release of the timer shaft is assured by limited angular displacement of the timer by the spring 110 upon deenergization of the solenoid coil 98. As the timing cycle approaches the end, the contacts 126 and 130 of the switch assembly 122 sequentially engage in order to initiate operation of the vehicle horn for an interval the length of which may be adjusted by the positioning screw 134 adjustably positioning the contact element 130 relative to the yieldably mounted contact element 126. When the contact element 130 finally engages at the end of the timing cycle, the relay coil 160 is reenergized to begin a new cycle. The cycle is therefore repeated until the relay circuit is opened by the on-off switch 28 or the alarm switch 50. Upon deenergization of the relay circuit 160, the device is automatically reset for subsequent operation when the timer 54 returns to its zero position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an alarm clock, a time controlled alerting mechanism comprising a mechanically settable timer, a timer setting motor, solenoid operated clutch means operatively connecting said motor to the timer for setting movement thereof, relay means responsive to alarm operation of the alarm clock for simultaneously energizing said motor and said clutch means, manually settable means operatively connected to the relay means for deenergization thereof in response to movement of the timer from a zero position by a predetermined amount, an alerting circuit, and switch means connected to said timer and the alerting circuit for sequentially energizing the alerting circuit and the relay means in response to approach of the timer to said zero position following deenergization of the relay means, whereby said alerting circuit is periodically energized for preset intervals spaced apart by a timing period predetermined by said manually settable means.

2. The combination of claim 1, wherein said switch means comprises a switch arm driven by the timer, fixedly mounted stop means for limiting movement of said switch arm, limit contact means mounted by the stop means for engagement with the switch arm at the zero position of the timer, and yieldable contact means mounted on the stop means for engagement with the switch arm before the limit contact means, said contact means being respectively connected to the relay means and the alerting circuit for said sequential energization thereof.

3. The combination of claim 2 including means for adjustably positioning said limit contact means on the stop means for varying the preset intervals during which the alerting circuit is energized.

4. The combination of claim 3 wherein said manually settable means comprises an adjustably positioned mounting member, circuit opening means mounted on said mounting member and connected to said relay means, switch actuating means mounted on said switch arm for engagement with the circuit opening means to deenergize said relay means, gear means drivingly engaged with said mounting member for adjustably positioning the circuit opening means in the path of movement of the switch actuating means, lock means engageable with the gear means for holding the mounting member in any position, and selectively operated control means engageable with the gear means and the lock means for simultaneous release of the lock means and rotation of the gear means to change said timing period.

5. The combination of claim 4 wherein said solenoid operated clutch means comprises an axially displaceable drive member connected to the motor, a driven element connected to the timer and engageable with the drive member, solenoid actuated shift means connected to the drive member for displacement thereof into engagement with the driven element and torque release means operatively connected to the timer and the shift means for limited displacement of the timer in response to deenergization of the relay means to positively effect disengagement of the driven element from the drive member.

6. The combination of claim 5 wherein said torque release means comprises means mounting said timer for limited angular displacement, spring means continuously biasing the timer to one angular position and cam means operatively connected to the shift means for displacing the timer to the other angular position against the bias of said spring means.

7. The combination of claim 1 wherein said manually settable means comprises, an adjustably positioned mounting member, circuit opening means mounted on said mounting member and connected to said relay means, switch actuating means connected to said switch means and driven by the timer for engagement with the circuit opening means to deenergize said relay means, gear means drivingly engaged with said mounting member for adjustably positioning the circuit opening means in the path of movement of the switch actuating means, lock means engageable with the gear means for holding the mounting member in any position, and selectively operated control means engageable with the gear means and the lock means for simultaneous release of the lock means and rotation of the gear means.

8. The combination of claim 7 wherein said solenoid operated clutch means comprises, an axially displaceable drive member connected to the motor, a driven element connected to the timer and engageable with the drive member, solenoid actuated shift means connected to the drive member for displacement thereof into engagement with the driven element and torque release means operatively connected to the timer and the shift means for limited displacement of the timer in response to deenergization of the relay means to positively effect disengagement of the driven element from the drive member.

9. The combination of claim 8 wherein said torque release means comprises means mounting said timer for limited angular displacement, spring means continuously biasing the timer to one angular position, and cam means operatively connected to the shift means for displacing the timer to the other angular position against the bias of said spring means.

10. The combination of claim 1 wherein said solenoid operated clutch means comprises an axially displaceable drive member connected to the motor, a driven element connected to the timer and engageable with the drive member, solenoid actuated shift means connected to the drive member for displacement thereof into engagement with the driven element and torque release means operatively connected to the timer and the shift means for limited displacement of the timer in response to deenergization of the relay means to positively effect disengagement of the driven element from the drive member.

11. The combination of claim 10 wherein said switch means comprises a switch actuating element driven by the timer, a fixedly mounted stop element, limit contact means mounted by one of said elements for engagement with the other element at the zero position of the timer, and yieldable contact means mounted on said one of the elements for engagement with the other element before the limit contact means, said contact means being respectively connected to the relay means and the alerting circuit for said sequential energization thereof.

12. In a vehicle having a source of electrical energy and a horn operating relay, a time controlled alerting mechanism including an alarm clock, a mechanically wound timer, a timer winding motor, solenoid operated clutch means for coupling said motor to the timer and control means for periodically energizing the horn operating relay in response to alarm operation of the alarm clock comprising, a switch actuator driven by said timer, a stop switch assembly electrically connected to the horn operating relay, a relay coil electrically connected to the stop switch assembly, normally opened switch means operatively connecting said source of electrical energy to the relay coil and the horn operating relay for energization thereof when the timer is in a zero position, relay switch means actuated in response to energization of said relay coil for connecting said source to the motor and the solenoid operated clutch means to wind the timer, a relay holding circuit connected to the relay coil for holding the same energized upon rotation of the timer from said zero position when being wound, and adjustably positioned means for interrupting said relay holding circuit upon rotation of the timer from said zero position by a predetermined amount to deenergize the motor and the solenoid operated clutch means, said stop switch assembly including means for sequentially energizing the horn operating relay and the relay coil in response to return of the timer toward the zero position following said interruption of the relay holding circuit.

References Cited by the Examiner
UNITED STATES PATENTS
2,926,486  3/1960  Graves _____ 58—18

LOUIS J. CAPOZI, *Primary Examiner.*
GERALD F. BAKER, *Examiner.*